(12) United States Patent
Delzell

(10) Patent No.: US 9,195,117 B2
(45) Date of Patent: Nov. 24, 2015

(54) MODIFIED SYSTEM AND METHOD FOR OBTAINING PHOTOGRAPHIC AND/OR VIDEOGRAPHIC IMAGES

(71) Applicant: William Connor Delzell, San Francisco, CA (US)

(72) Inventor: William Connor Delzell, San Francisco, CA (US)

(*) Notice: Subject to any disclaimer, the term of this patent is extended or adjusted under 35 U.S.C. 154(b) by 0 days.

(21) Appl. No.: 14/214,268

(22) Filed: Mar. 14, 2014

(65) Prior Publication Data

US 2014/0198250 A1    Jul. 17, 2014

Related U.S. Application Data

(63) Continuation-in-part of application No. 13/938,396, filed on Jul. 10, 2013, now Pat. No. 8,768,155, which is a continuation of application No. 13/147,129, filed as application No. PCT/US2010/022472 on Jan. 29, 2010, now Pat. No. 8,488,954.

(60) Provisional application No. 61/148,307, filed on Jan. 29, 2009, provisional application No. 61/782,865, filed on Mar. 14, 2013.

(51) Int. Cl.
*G03B 15/02* (2006.01)
*G03B 15/07* (2006.01)

(52) U.S. Cl.
CPC ............... *G03B 15/02* (2013.01); *G03B 15/07* (2013.01)

(58) Field of Classification Search
USPC ............ 396/3, 4, 1; 362/3, 11, 12, 14, 16–18
See application file for complete search history.

(56) References Cited

U.S. PATENT DOCUMENTS

| | | | |
|---|---|---|---|
| 2,549,330 A * | 4/1951 | Noel | 362/10 |
| 3,378,678 A * | 4/1968 | De Groff | 362/5 |
| 3,952,322 A | 4/1976 | Wolfe | |
| 4,236,795 A | 12/1980 | Kephart | |
| 4,288,844 A * | 9/1981 | Fisher et al. | 362/33 |
| 5,481,439 A * | 1/1996 | Goto | 362/5 |
| 5,704,702 A | 1/1998 | Goto | |
| 6,270,228 B1 | 8/2001 | Axen et al. | |
| 6,402,351 B1 * | 6/2002 | Borders et al. | 362/395 |
| 6,412,971 B1 | 7/2002 | Wojnarowski et al. | |
| 7,044,613 B2 | 5/2006 | Debevec | |
| 7,177,537 B1 | 2/2007 | Adolphi et al. | |
| 7,406,256 B1 | 7/2008 | Adolphi et al. | |

(Continued)

OTHER PUBLICATIONS

International Search Report and Written Opinion dated Sep. 19, 2014 in corresponding International Patent Application No. PCT/US2014/029546, filed Mar. 14, 2014.

(Continued)

*Primary Examiner* — Clayton E Laballe
*Assistant Examiner* — Warren K Fenwick
(74) *Attorney, Agent, or Firm* — Rankin, Hill & Clark LLP

(57) ABSTRACT

A light-supporting structure and methods of using same that includes a central hub including a suspension point, a plurality of arms extending from the central hub, a separate support rod extending from each of the plurality of arms distal to the central hub, a separate lighting element mounted to each support rod, and a control system configured to orient each lighting element using motors with respect to a photographic zone. In a preferred embodiment, the lighting elements can be oriented with respect to a photographic zone in response to a user input selection based on a desired photographic result selected at a user interface.

19 Claims, 7 Drawing Sheets

(56) References Cited

U.S. PATENT DOCUMENTS

| | | | |
|---|---|---|---|
| 7,470,044 B2 | 12/2008 | Maes | |
| 7,567,833 B2 * | 7/2009 | Moctezuma De La Barrera et al. | 600/424 |
| 8,406,859 B2 * | 3/2013 | Zuzak et al. | 600/476 |
| 8,488,954 B2 | 7/2013 | Delzell | |
| 2002/0015296 A1 * | 2/2002 | Howell et al. | 362/11 |
| 2003/0002730 A1 | 1/2003 | Petrich | |
| 2004/0052076 A1 * | 3/2004 | Mueller et al. | 362/293 |
| 2008/0055880 A1 | 3/2008 | Williams et al. | |
| 2008/0259600 A1 | 10/2008 | Pohlert et al. | |
| 2010/0056928 A1 * | 3/2010 | Zuzak et al. | 600/476 |
| 2012/0044374 A1 | 2/2012 | Pohlert et al. | |
| 2013/0060146 A1 * | 3/2013 | Yang et al. | 600/476 |

OTHER PUBLICATIONS

International Preliminary Report on Patentability dated Aug. 2, 2011 in corresponding International Application No. PCT/US2010/022472.

* cited by examiner

MODIFIED SYSTEM AND METHOD FOR OBTAINING PHOTOGRAPHIC AND/OR VIDEOGRAPHIC IMAGES

CROSS-REFERENCE TO RELATED APPLICATIONS

This application is a continuation-in-part of U.S. application Ser. No. 13/938,396, filed Jul. 10, 2013, now U.S. Pat. No. 8,768,155, which application is a continuation of U.S. application Ser. No. 13/147,129, filed Sep. 15, 2011, now U.S. Pat. No. 8,488,954, which application is a U.S. National Stage of International Application No. PCT/US2010/022472, filed Jan. 29, 2010, and claimed priority to U.S. Provisional App. Ser. No. 61/148,307, Filed Jan. 29, 2009. This application also claims priority to U.S. Provisional App. Ser. No. 61/782,865, filed Mar. 14, 2013.

BACKGROUND OF INVENTION

1. Field of Invention

The present invention relates to a user controlled system and method for obtaining high quality photography and video.

2. Description of Related Art

In International App. Ser. No. PCT/US2010/022472, applicant disclosed a user controlled system and method for obtaining high quality photographic and/or videographic images. FIGS. 1 and 2 of such application depict a light-supporting structure comprising a plurality of lights (e.g., a "key" light 180, a camera right side light 190, a camera left side light 200 and a top "hair" light 210), each of which are independently positionable by a gantry system 80 associated with a respective grid structure 20, 30, 40, 50. The present application discloses a light-supporting structure. The light-supporting structure can be used in a variety of applications, including as an alternative to the light-supporting structure disclosed in International App. Ser. No. PCT/US2010/022472.

BRIEF SUMMARY OF THE INVENTION

The present application discloses a light-supporting structure that comprises a central hub including a suspension point, a plurality of arms extending from the central hub, a separate support rod extending from each of the plurality of arms distal to the central hub and a separate lighting element mounted to each support rod. A rotation motor operatively associated with the central hub is configured to rotate the plurality of arms about a vertical axis that passes through the suspension point. An elevation motor operatively associated with the central hub is configured to raise and lower the plurality of arms relative to a horizontal plane that bisects the vertical axis. A separate support rod rotation motor is operatively associated with each of the plurality of arms for rotating the respective support rod relative thereto. In addition, a separate support rod pitch motor is operatively associated with each of the plurality of arms and its respective support rod for adjusting an angle therebetween. And, a control system is configured to control the rotation motor, the elevation motor, each support rod rotation motor and each support rod pitch motor so as to orient each lighting element with respect to a photographic zone.

In a preferred embodiment, the control system comprises a processor, a memory operatively associated with the processor, and a database comprising a plurality of lighting formulas stored in the memory. Each of said plurality of lighting formulas includes an associated image. The control system further comprises a graphic user interface operatively associated with the processor. The graphic user interface is configured to display the associated image of each of said plurality of lighting formulas to a user, and to transmit a user selection of one of said plurality of lighting formulas based on its associated image to the processor. In turn, the processor is configured to send a command to the rotation motor, the elevation motor, each support rod rotation motor and each support rod pitch motor to orient each lighting element with respect to the photographic zone based on the user selection transmitted from the graphic user interface to the processor.

The present application also discloses methods for obtaining photographic and/or videographic images using the light-supporting structure disclosed herein. In one embodiment, the method includes displaying at least one image associated with one of said plurality of lighting formulas to a user on a graphic user interface, and transmitting a user selection of one of a plurality of lighting formulas based on an image associated therewith via the graphic user interface to a processor, which sends a command to the rotation motor, the elevation motor, each support rod rotation motor and each support rod pitch motor to orient each lighting element with respect to the photographic zone based on the user selection transmitted from the graphic user interface to the processor.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

International App. Ser. No. PCT/US2010/022472 is hereby incorporated by reference in its entirety as if fully presented herein.

Figure 1:
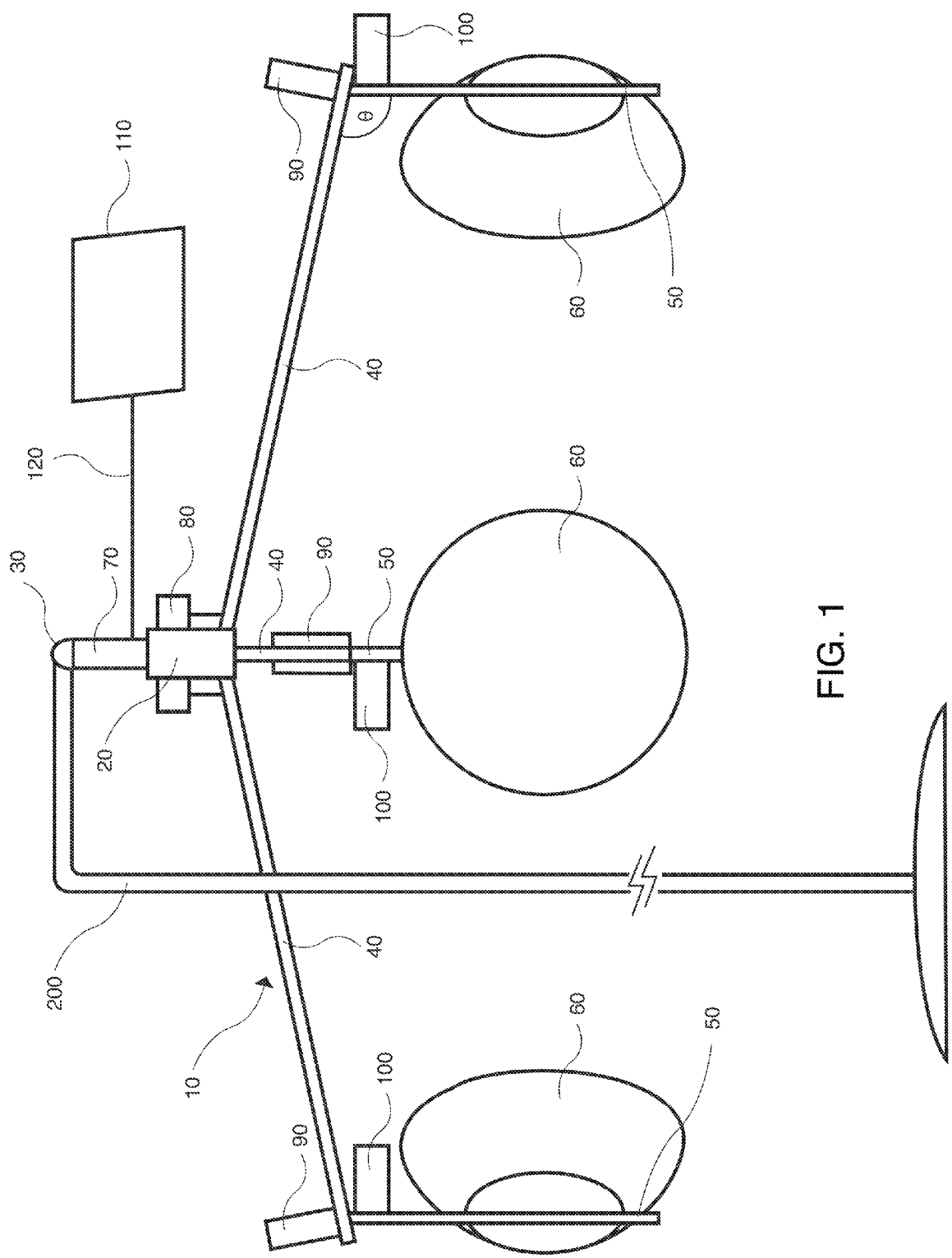
FIG. 1 is a schematic side plan view of an exemplary light-supporting structure according to the invention supported by a stand.

FIG. 1 accompanying the present application is a schematic side plan view of such a light-supporting structure 10 that includes a central hub 20 and an associated suspension point 30 for suspending the light-supporting structure from a ceiling, a boom or other elevated support. In FIG. 1, the light-supporting structure 10 is schematically depicted as being suspended from a stand 200. A plurality of arms 40 extend from the central hub 20. A separate and distinct support rod 50 extends from each of the plurality of arms 40 distal to the central hub 20. A separate lighting element 60 is mounted to each support rod 50. A rotation motor 70 is operatively associated with the central hub 20 for rotating the plurality of arms 40 about a vertical axis that passes through the suspension point 30. An elevation motor 80 is operatively associated with the central hub 20 for raising and lowering the plurality of arms 40 relative to a horizontal plane that bisects the vertical axis. A separate support rod rotation motor 90 is operatively associated with each of the plurality of arms 40 for rotating the respective support rod 50 relative thereto. And, a separate support rod pitch motor 100 is operatively associated with each of the plurality of arms 40 and its respective support rod 50 for adjusting an angle θ therebetween.

A control system 110 is connected to the light-supporting structure 10 via circuitry 120. The control system 110 is configured to control the rotation motor 70, the elevation motor 80, each support rod rotation motor 90 and each support rod pitch motor 100 so as to orient each lighting element 60 with respect to a photographic zone, which is preferably located within in a cone that expands as it extends in a downward direction from the suspension point 30 and is illuminated in a manner selected by a user.

Figure 2:
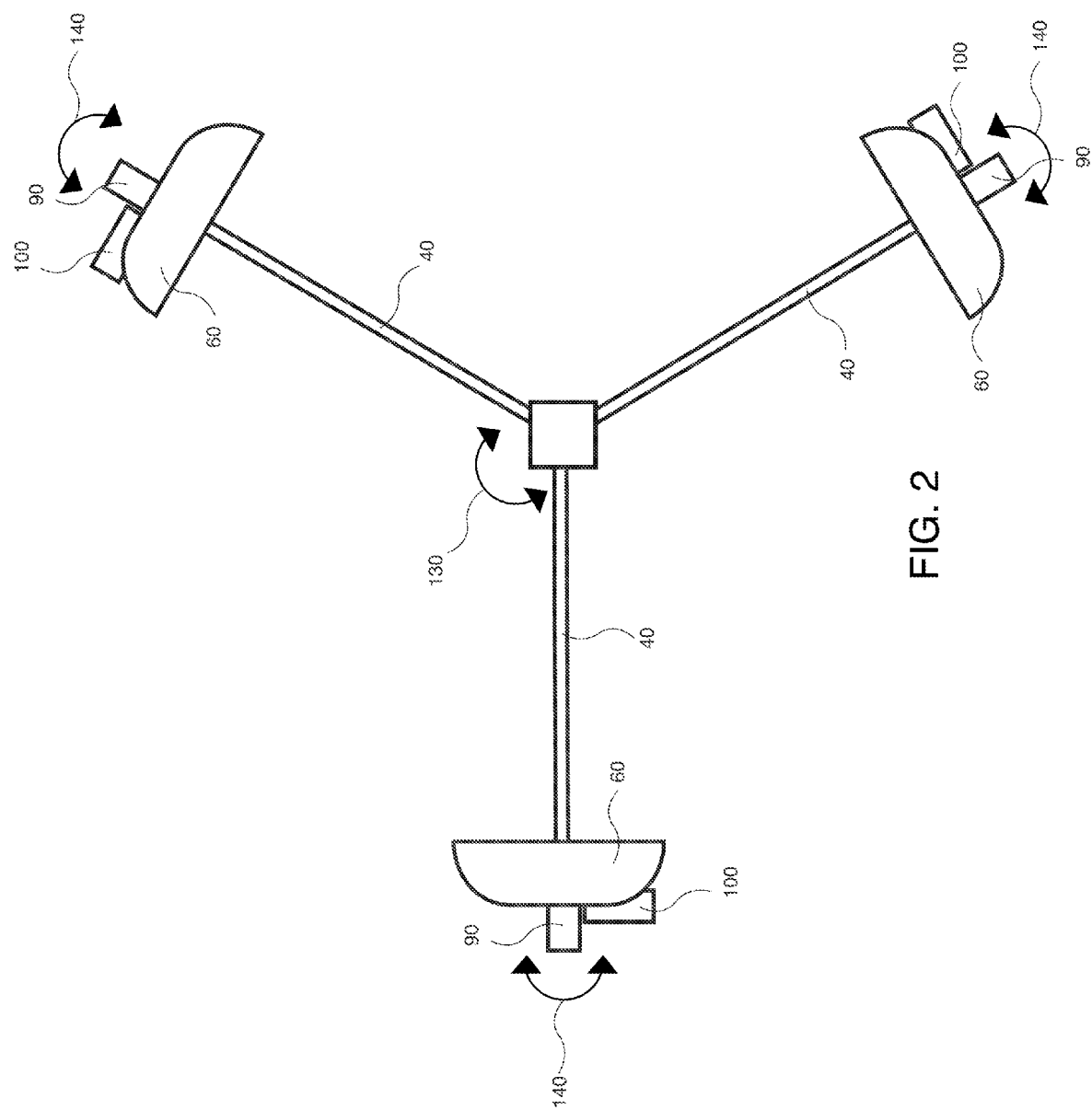
FIG. 2 is a schematic top plan view of the light-supporting structure shown in FIG. 1.

As noted, the control system controls the various motors, 70, 80, 90 and 100 associated with the light-supporting structure 10 to create a desired lighting effect in the photographic zone. The rotation motor 70 can rotate the arms 40 about the central hub 20, as depicted by arrow 130 in FIG. 2 accompanying the present application. In the illustrated embodiment, there are three arms 40, each of which extends from the central hub 20 at a 120° angle from the neighboring arm. It will be appreciated that only two, or more than three, arms could be used, if desired, and that the angle between the arms (when viewed from above along the vertical axis) could be fixed or independently adjustable using additional motors. Applicant has found that three arms having a fixed angle of 120° (when viewed from above along the vertical axis) is generally suitable for most photographic applications.

Figure 3:
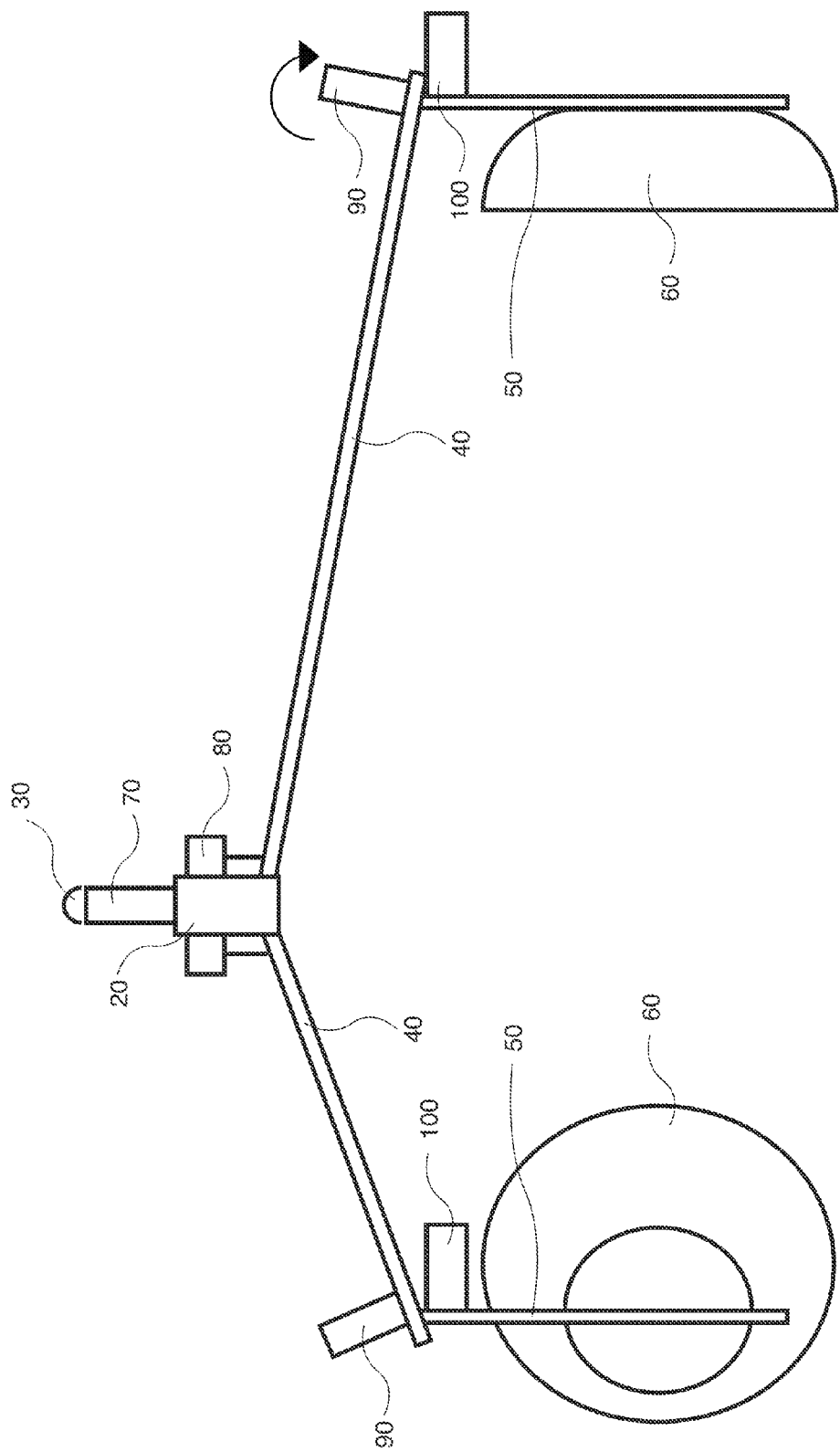
FIG. 3 is another schematic side plan view of the light-supporting structure shown in FIG. 1.

FIG. 3 accompanying the present application shows another side plan view of the light-supporting structure shown in FIG. 1. In FIG. 3, it is not possible to see the rearmost lighting element, arm and support rod because the rotation motor has rotated the arms with respect to the central hub, and now one of the lighting elements is behind the foremost lighting element on the left (and therefore hidden from view).

Figure 4:
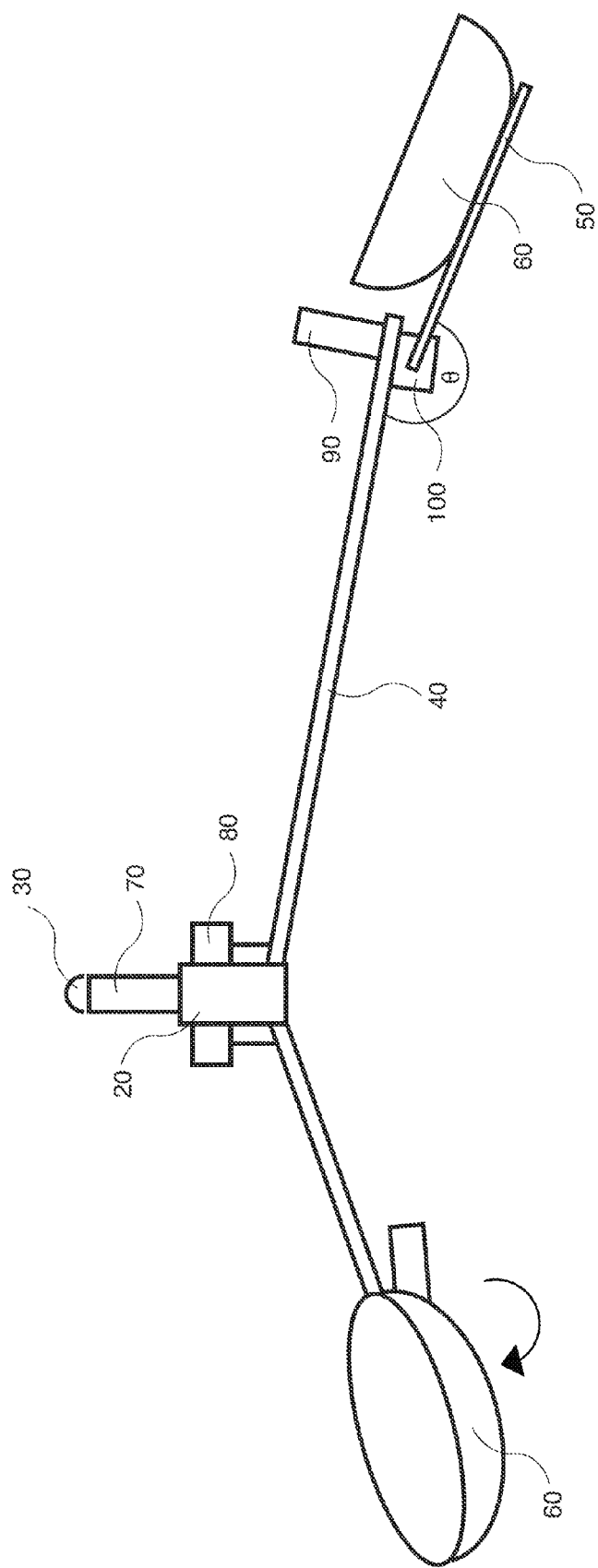
FIG. 4 is another schematic side plan view of the light-supporting structure shown in FIG. 3 with the lighting elements in a different orientation.

FIG. 4 accompanying the present application is another schematic side plan view of the light-supporting structure shown in FIG. 3 with the lighting elements in a different orientation. Support rod rotation motor 90 has rotated each support rod 50 and thus each lighting fixture 60 mounted thereto (this rotation is depicted by arrow 140 in FIG. 2). In addition, each support rod pitch motor 100 has changed (increased) the angle θ by moving the support rod relative to the respective arm. The lighting elements are now positioned to radiate light upwardly.

Figure 5:
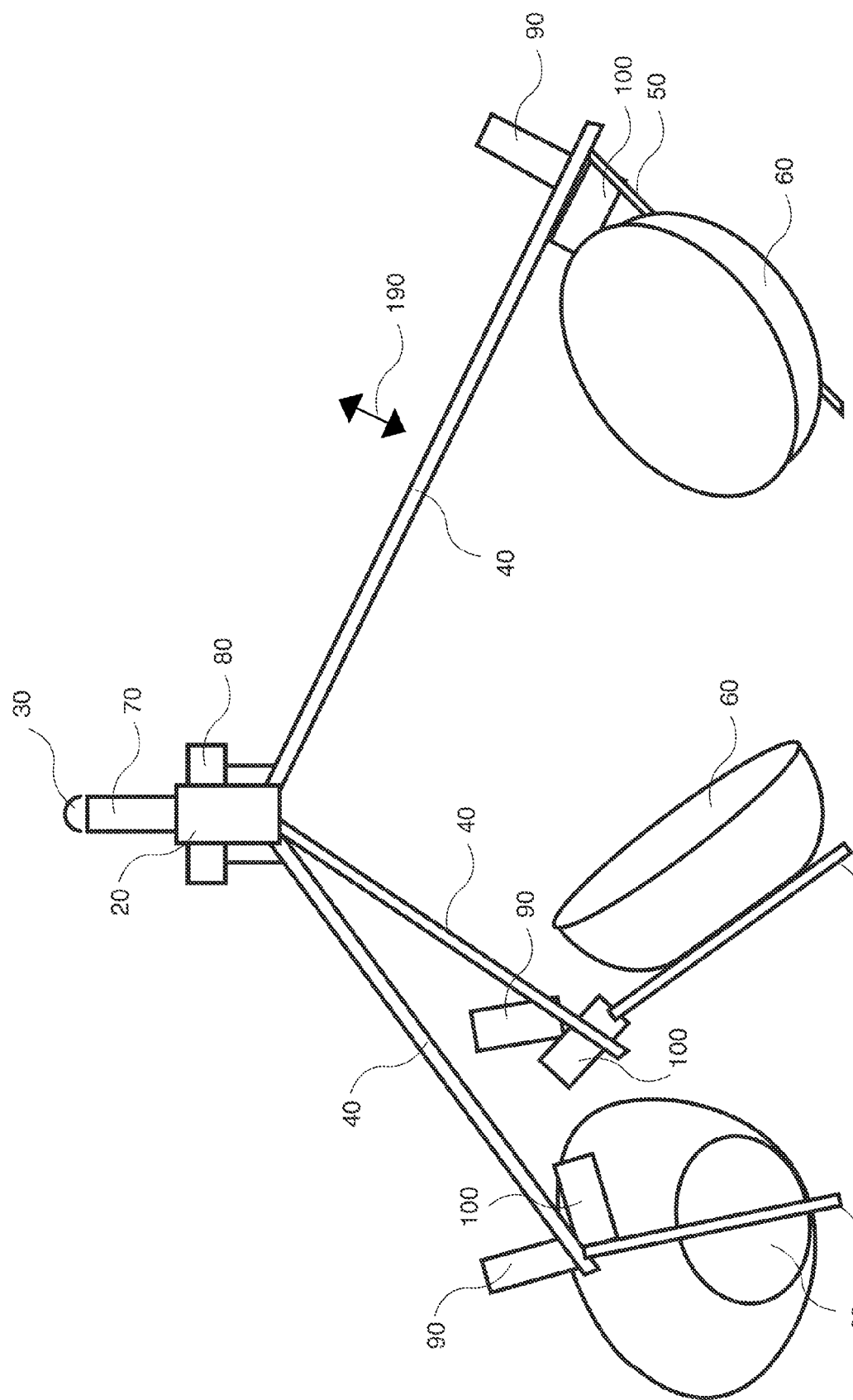
FIG. 5 is yet another schematic side plan view of the light-supporting structure shown in FIG. 1 with the lighting elements in a different orientation.
Figure 6:
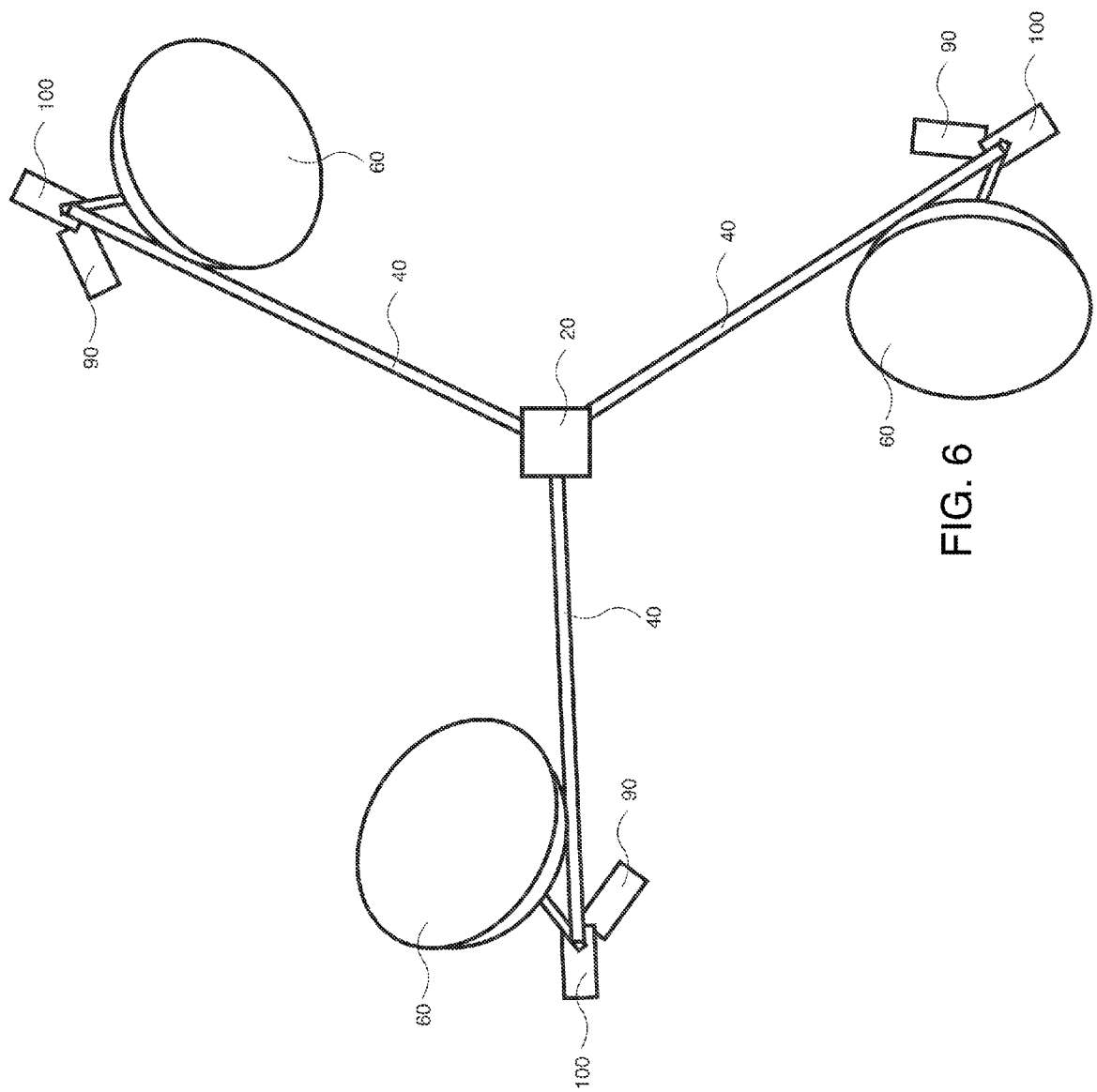
FIG. 6 is schematic top plan view of the light-supporting structure shown in FIG. 1 with the lighting elements oriented as shown in FIG. 5.

FIGS. 5 and 6 accompanying the present application show a side plan view and a top plan view, respectively, of the light-supporting structure shown in FIG. 1 in yet another orientation. All three lighting elements 60 are now visible (as compared, for example, to the orientation shown in FIG. 4) because the arms have been rotated relative to the central hub by operation of the rotation motor 70. The elevation of the arms 40 has been reduced by operation of elevation motor 80 (as compared, for example, to the orientation shown in FIG. 4). Arrow 190 depicts that the arms 40 can be raised or lowered. The lighting elements 60 have been rotated by operation of the support rod rotation motors 90 (as compared, for example to the orientation shown in FIG. 4) such that they now point upwardly at an angle. And, the angle θ between the arms 40 and the support rods 50 has been reduced by operation of the pitch motors 100 (as compared, for example, to the orientation shown in FIG. 4).

Figure 7:
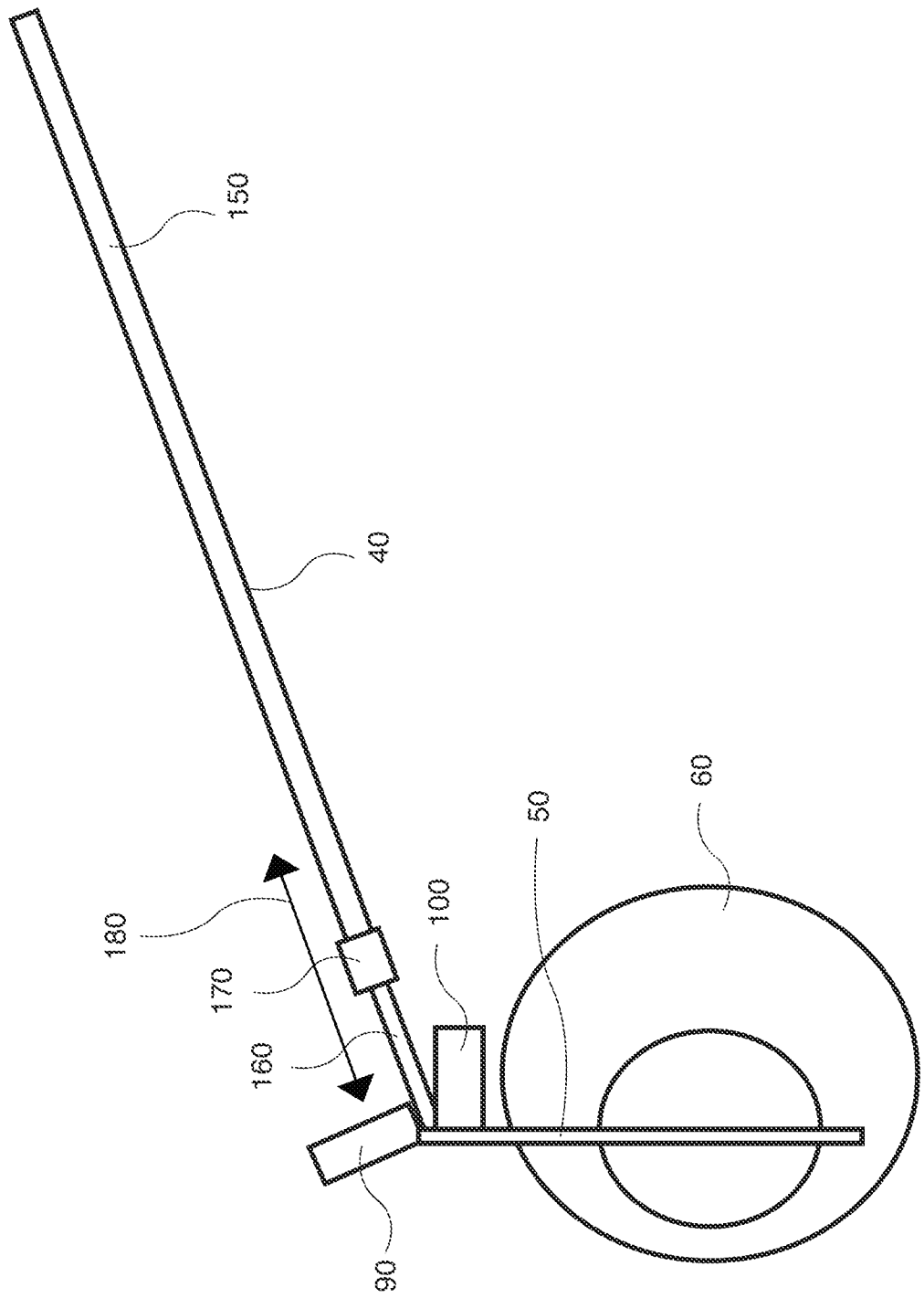
FIG. 7 is a schematic side view of a portion of an alternative embodiment of a light-supporting structure according to the invention having extendable arms.

FIG. 7 is a schematic side view of a portion of an alternative embodiment of a light-supporting structure according to the invention having extendable arms. FIG. 7 shows an arm 40, its associated support rod 50 and a lighting element 60 mounted to the arm. In this embodiment, the arm 40 comprises a first portion 150 that extends from the central hub (not shown) and a second portion 160, which can be extended from the first portion 150 via motor 170 and also retracted from an extended position back into the first portion 15 via motor 170. Arrow 180 shows the manner in which the arm 40 can be lengthened and shortened, as directed by the control system 110.

The control system 110 can take any configuration, provided that it is capable of controlling the motors associated with the light-supporting structure to produce a desired lighting effect. Thus, the light-supporting structure disclosed in the present application could be utilized with conventional lighting and photography equipment. More preferably, the control system functions in the same manner as the control system for the lighting structure disclosed in International App. Ser. No. PCT/US2010/022472. Thus, the control system preferably comprises a processor, a memory operatively associated with the processor, a database comprising a plurality of lighting formulas stored in the memory, wherein each of said plurality of lighting formulas includes an associated image, and a graphic user interface operatively associated with the processor. The graphic user interface is configured to display the associated image of each of said plurality of lighting formulas to a user, and to transmit a user selection of one of said plurality of lighting formulas based on its associated image to the processor. The processor is configured to send a command to the rotation motor, the elevation motor, each support rod rotation motor and each support rod pitch motor to orient each lighting element with respect to the photographic zone based on the user selection transmitted from the graphic user interface to the processor.

The graphic user interface ("GUI") allows users to automatically select the desired lighting style by means of a touch screen or other input device (e.g., computer keyboard, game controller, preset motorized controller, mobile phone interface, vocal command receiving unit etc.). Optional sensors can further communicate with the processor so that adjustments can be made to the orientation and intensity of the lighting to produce the effect desired by the user. Thus, a multitude of different lighting formulas can be implemented quickly from a single location without the need for the photographer to manipulate lights. One or more wired or wireless sensors could be placed in a photographic zone beneath the light-supporting structure to measure light, if desired.

In a preferred embodiment, a user encounters a graphic user interface ("GUI") that displays a plurality of images such as, for example, various famous portraits, music album covers or a library of preset images previously made using the lighting system. The user can review the menu of images and then make a selection by, for example, touching a touch screen. The CPU processes the user selection by accessing the necessary database of lighting formulas, and would initiate commands to the controllers to move and/or rotate the various lights to the position required to duplicate the lighting effect displayed in the selected image and, optionally, position the camera and set its variables (focal length, shutter speed, lens type etc.) as needed. Motors, as described above, move the arms and support rods (and thus the lighting elements associated therewith) to the appropriate location and position simultaneously, by elevating or lowering the arms, extending and/or retracting the arms, and rotating and/or canting the support rods relative to the arms until all of the lighting elements necessary to produce the selected lighting effect were in the proper position. Dependent upon the requirements necessary to duplicate the lighting effect in the selected image, one or more of the lights might be turned off, the intensity of one or more of the lights may be adjusted and/or one or more of the lights may face towards or away from the photographic zone. The settings of the lights intensity and power would also be set by the controller/CPU and coordinated with the strobe. The user (or his or her subject) would face the camera and receive any further instructions or reminders on a teleprompter, and be able to view images as they are captured. Throughout the process, the subject would be surrounded by properly spaced lighting, allowing the subject to move away or toward the camera without any degradation to the lighting effect within the photographic zone.

Preferably, the processor is configured to add lighting formulas and associated images to the database based on photographic and/or videographic images obtained using the camera. Meta data can be embedded in each image that identifies all of the existing camera settings (e.g., F-stop, shutter speed, color temp, other camera presets) and all lighting parameters associated with the image (e.g., all light power distribution settings, the position of the lighting elements, the subjects and the camera position). This meta data is embedded into a standard image format (e.g., .jpg), and not incorporated directly into the raw images, which can be proprietary to each camera manufacturer.

In a further embodiment the graphic interface may be incorporated into the teleprompter while maintaining touch screen ability, in a manner similar to a computer touch screen commonly found in stores or home computers. Additionally the CPU continuously records and updates the central database via a log or memory. This updated database allows for reproducing results of any kind. As a further example a professional photographer may wish to override preprogrammed settings to achieve a desired result. The CPU would recognize the movements and log each movement of individual light frames as well as any other adjustments (e.g. light speed or intensity) and store any new configuration as and accessible setting available for recall.

The software that drives the hardware of the unit has an aspect of the software that we refer to herein as the subsystem. This subsystem controls and gives motion, intensity, firing, and any individual instructions require by individual hardware pieces in the unit. This may include the intensity, color, and direction of a light source, or, the location, focal length, and speed of a camera. Any individual piece of hardware like exampled but not limited to the above must be individually controlled. This subsystem is a package of software that controls all of these functions seamlessly though a cohesive program running on a CPU driven automatically, manually, or remotely.

The software that drives the unit also has an aspect of the software herein referred to as the output interface. Every still, video, or motion capture device, once used, outputs raw imaging data to the imaging pipeline or unit infrastructure. The output aspect of this software sets the delivery parameters that the unit delivers this raw data to the user. This is not limited to converting raw still to formats (e.g., .jpg) at smaller sizes, converting raw video to 3D instantly viewable content, or converting raw sensor video (bayer or non-bayer patterned) to easily usable lower resolution or simply greater compressed quality. By setting this output interface's options one may use the system to acquire any format, size, or style of stills, video, or motion capture one could wish. This system could be updated as new output formats or technologies are become useable. The user experience of raw data capture to their quickly usable delivery format would be seamless. It should be noted that this output interface can be used in a stand alone mode but by default is highly integrated with the rest of the software systems.

The software that drives the unit would also have a manual control user interface. This advanced software function allows the user through either a graphic user interface ("GUI") or through pure console text to adjust any aspect of the subsystem individually. This provides maximum control of the unit to the user and includes manual control of every single sub-function on the unit. This manual control interface also allows the memorization of the parameters for the unit set by the user for fast recall.

The software that drives the unit also has a main GUI that can drive the unit in a more semi-automatic mode. This GUI takes preset advanced software functions from above and organizes these memorized patterns into a tiered choice driven interface. The user can by using this GUI either search for a specific style, look, creator, or era of lighting and shooting style by a text field or a contextually tiered database. Each of these presets from the advanced functions will include a reference image in the GUI as an example of the look that the preset creates. The tiering of the menus will be in a familiar style so not as to overwhelm the user with too many choices from the start. An example of this would be the top level of the menu could be PORTRAIT. The next level of choices could be FASHION, CLASSIC or NATURAL LIGHT. In the fashion sub-menu one tier down you could have NEW YORK, HIGH KEY, LOW KEY, RING or BACK LIGHT. These are of course examples and there would be hundreds of choices, thousands, or even tens of thousands of choices, as desired. Each of these choices could be recalled through a favorites menu for fast recovery of user highly used or preferred choices. These software functions could be stand alone or integrated and all could interact with each other. The full power of the system is realized once all systems are used by the user as a fully integrated unit.

In accordance with the method of the invention, the light-supporting structure is first suspended from an appropriate elevated structure utilizing the suspension point. The stand 200 shown in FIG. 1 is exemplary only. The light-supporting structure can be permanently suspended (e.g., from the ceiling of a photographic studio). Alternatively, the light-supporting structure can be suspended from a boom or from a temporary elevated structure. In one embodiment, the light-supporting structure is suspended by an adjustable height arm, which is weighted at the base to counterbalance the weight of the lights, robotics and structure.

The lighting elements are shown schematically in the accompanying drawing figures. It will be appreciated that the lighting elements can take any shape or form, and can be of any desired configuration. Suitable lights include, for example, strobe lighting, metal-halide gas discharge medium arc-length lamps (e.g., HMI lamps sold by Osram Licht AG), tungsten lighting, LESD lighting and other lighting utilized in the photography and motion picture industries.

Once the light-supporting structure is suspended above a photographic zone, the method further comprises displaying at least one image associated with one of said plurality of lighting formulas to a user on the graphic user interface, and transmitting a user selection of one of said plurality of lighting formulas based on the image associated therewith via the graphic user interface to the processor. As noted above, the processor sends a command to the rotation motor, the elevation motor, each support rod rotation motor and each support rod pitch motor to orient each lighting element with respect to the photographic zone based on the user selection transmitted from the graphic user interface to the processor. The method can further comprise the step of adding lighting formulas and associated images to the database based on photographic and/or videographic images obtained using the camera. Each of the plurality of lighting formulas can comprise one or more parameters selected from the group consisting of flash intensity, speed, duration.

It should be appreciated that individual parts of the system are preferably made of lightweight materials and connected permanently as to become components that are part of a kit that quickly assembles and disassembles for use. Alternatively, the light-supporting structure could be permanently affixed to an overhead structure (e.g., a ceiling in a retail portrait studio).

The dimensions of the light-supporting structure are not per se critical. Preferably, the dimensions of the structure may be optimized for particular applications. When utilized to obtain images of individuals or small groups of individuals, each arm can extend a distance from the central hub of from about 4' to about 8', with the length preferably being adjustable via motors within that range. It will be appreciated that each arm could extend or retract independently of each other arm. It is conceivable to build larger and smaller versions of the basic system to adapt to various applications. There is no practical limit to the length of the arms (beyond material strengths) if the system is properly counterbalanced.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A light-supporting structure comprising:
   a central hub including a suspension point;
   a plurality of arms extending from the central hub;
   a separate support rod extending from each of the plurality of arms distal to the central hub;
   a separate lighting element mounted to each support rod;
   a rotation motor operatively associated with the central hub for rotating the plurality of arms about a vertical axis that passes through the suspension point;
   an elevation motor operatively associated with the central hub for raising and lowering the plurality of arms relative to a horizontal plane that bisects the vertical axis;
   a separate support rod rotation motor operatively associated with each of the plurality of arms for rotating the respective support rod relative thereto;
   a separate support rod pitch motor operatively associated with each of the plurality of arms and its respective support rod for adjusting an angle therebetween; and
   a control system configured to control the rotation motor, the elevation motor, each support rod rotation motor and each support rod pitch motor so as to orient each lighting element with respect to a photographic zone, wherein the control system comprises:
   a processor;
   a memory operatively associated with the processor;
   a database comprising a plurality of lighting formulas stored in the memory, wherein each of said plurality of lighting formulas includes an associated image; and
   a graphic user interface operatively associated with the processor, said graphic user interface being configured to display the associated image of each of said plurality of lighting formulas to a user, and to transmit a user selection of one of said plurality of lighting formulas based on its associated image to the processor, and wherein, the processor is configured to send a command to the rotation motor, the elevation motor, each support rod rotation motor and each support rod pitch motor to orient each lighting element with respect to the photographic zone based on the user selection transmitted from the graphic user interface to the processor.

2. The light-supporting structure according to claim 1, wherein three arms extend from the central hub.

3. The light supporting structure according to claim 2, wherein the three arms extending from the central hub are sequentially arranged 120° from each other about the vertical axis.

4. The light-supporting structure according to claim 1, wherein the light-supporting structure is suspended via the suspension point from a ceiling.

5. The light-supporting structure according to claim 1, wherein the light-supporting structure is suspended via the suspension point from a boom.

6. The light-supporting structure according to claim 1, wherein the elevation motor is configured to elevate each of the plurality of arms independently.

7. The light-supporting structure according to claim 1, wherein a camera is operatively associated with the processor.

8. The light-supporting structure according to claim 7, wherein the processor adds lighting formulas and associated images to the database based on photographic and/or videographic images obtained using the camera.

9. The light-supporting structure according to claim 7, wherein each of said plurality of lighting formulas comprises one or more parameters selected from the group consisting of flash intensity, speed, duration.

10. The light-supporting structure according to claim 1, wherein the graphic user interface is a touch screen.

11. A method for obtaining photographic and/or videographic images, the method comprising:
    providing a light-supporting structure according to claim 1;
    displaying at least one image associated with one of said plurality of lighting formulas to a user on the graphic user interface; and
    transmitting a user selection of one of said plurality of lighting formulas based on the image associated therewith via the graphic user interface to the processor, wherein, the processor sends a command to the rotation motor, the elevation motor, each support rod rotation motor and each support rod pitch motor to orient each lighting element with respect to the photographic zone based on the user selection transmitted from the graphic user interface to the processor.

12. The method according to claim 11, wherein three arms extend from the central hub.

13. The method according to claim 12, wherein the three arms extending from the central hub are sequentially arranged 120° from each other about the vertical axis.

14. The method according to claim 11, wherein the system further comprises a camera operatively associated with the processor and wherein the method further comprises adding lighting formulas and associated images to the database based on photographic and/or videographic images obtained using the camera.

15. The method according to claim 14, further comprising adding lighting formulas and associated images to the database based on photographic and/or videographic images obtained using the camera.

16. The method according to claim 15, wherein each of said plurality of lighting formulas comprises one or more parameters selected from the group consisting of flash intensity, speed, duration.

17. The method according to claim 11, further comprising suspending the light-supporting structure from a ceiling via the suspension point.

18. The method according to claim 11, further comprising suspending the light-supporting structure from a boom via the suspension point.

19. The method according to claim 11, wherein the graphic user interface is a touch screen.

\* \* \* \* \*